June 6, 1944.  J. L. BREESE  2,350,872
POT TYPE BURNER
Filed May 16, 1942  2 Sheets-Sheet 1

Inventor
James L. Breese
by Parker Painter
Attorneys.

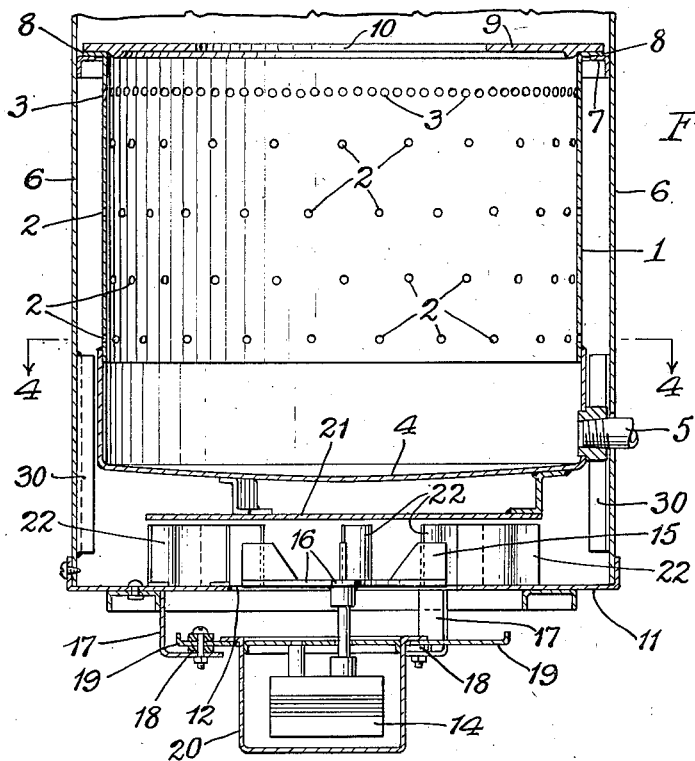
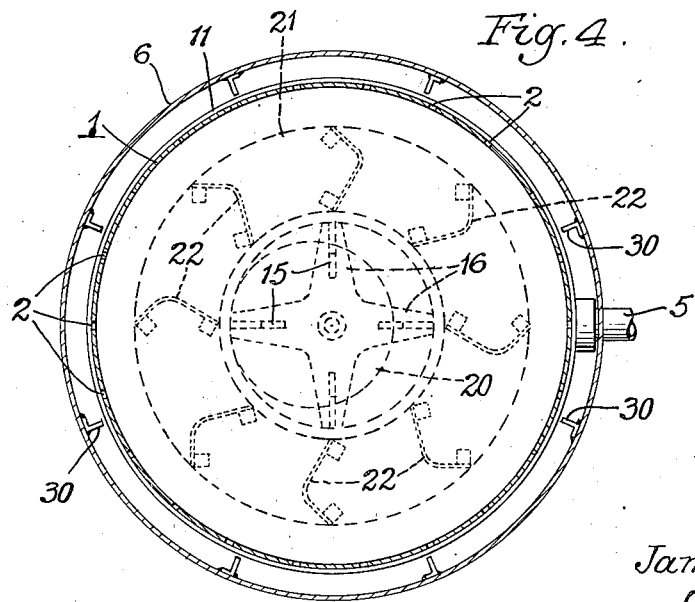

Patented June 6, 1944

2,350,872

UNITED STATES PATENT OFFICE 2,350,872

POT TYPE BURNER

James L. Breese, Santa Fe, N. Mex., assignor to Oil Devices, Santa Fe, N. Mex., a limited partnership of Illinois Application May 16, 1942, Serial No. 443,263

7 Claims. (Cl. 158—91)

My invention relates to an improvement in burners and has for one purpose the provision of improved means for guiding the air to and about a burner pot of a pot type burner.

Another purpose is to provide means for preventing air eddies and consequent spiraling or swirling of the flame within the pot.

Other purposes will appear from time to time in the course of the specification.

I illustrate my invention more or less diagrammatically in the accompanying drawings wherein:

Fig. 3 is a vertical section through another form of the device; and

Fig. 4 is a section on the line 4—4 of Fig. 3.

Like parts are indicated by like symbols throughout the specification and drawings.

Figure 1:
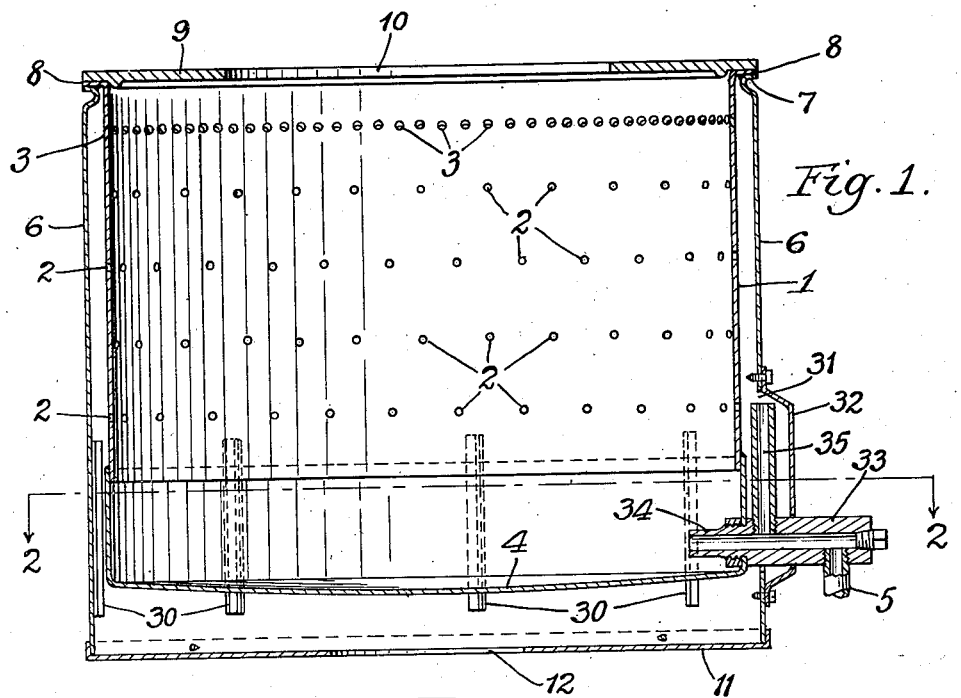
Fig. 1 is a vertical section.
Figure 2:
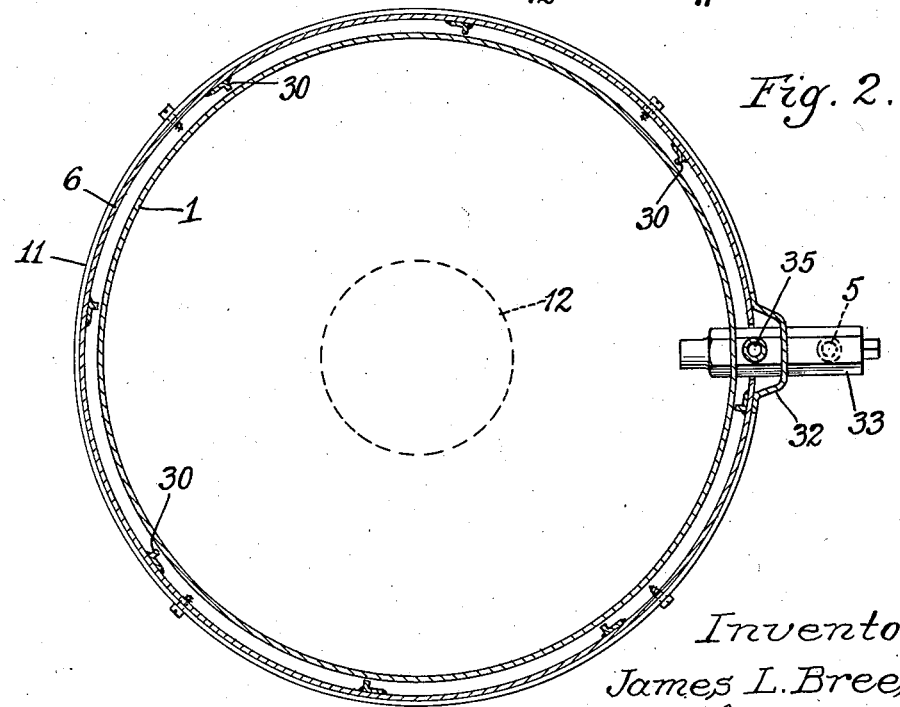
Fig. 2 is a section on the line 2—2 of Fig. 1.

Referring first to the form of Figs. 1 and 2, I illustrate generally a burner unit, which includes a burner pot 1 having a plurality of primary air inlet apertures 2 located at various levels, and a row of more closely spaced and preferably larger secondary air inlets 3 located adjacent the top of the pot. The pot bottom 4 is upwardly concave and receives a supply of fuel from any suitable source, for example from the pipe 5. 6 is an outer air housing or drum surrounding the pot. The pot may be mounted therein, for example by the flange 7, which receives an upper flange 8 of the pot.

9 is any suitable flame ring for the top of the pot, provided with a central aperture 10. 11 is a bottom member for the outer housing 6, which is provided with a preferably central aperture 12. In the aperture 12 I may, if desired, position any suitable motor and fan unit, such as is shown in Figs. 3 and 4. Or I may leave it open when relying on natural draft. In either event I provide a plurality of vertical baffles 30, which extend upwardly into the space between a lower portion of the pot 1 and the outer housing 6. These baffles direct the air upwardly about the pot and prevent a rotary circulation of the air, which if permitted tends to cause the flame within the pot to rotate or spiral.

I illustrate the outer housing 6 as cut away or apertured, as at 31, the space being closed by a housing extension 32, through which extends the nozzle element 33, in communication with the fuel pipe 5. The nozzle element may, if desired, be provided with an end 34, extending into the pot. For a pilot flame I may supply primary air through the air pipe or air inlet 35, which may be located in the space within the sub-housing or housing extension 32.

In the form of Figs. 3 and 4 I illustrate a pot and outer housing of somewhat different proportions, it being understood that the proportions and shape of the various parts may be substantially varied. The bottom 11, however, has an aperture 12, and in this aperture I may position any suitable motor fan unit, including any suitable motor 14, with the fan 15. The fan includes arms 16 in the general plane of the wall 11, with the blades projecting into the space within the housing. The motor and fan unit may be mounted in any suitable manner, and I illustrate for example brackets 17 and yielding buffers 18 to receive any suitable outward extension or extensions 19 of the housing 20 which surrounds the motor structure 14.

I may, if desired, employ a plate 21 between the fan and the bottom of the pot to assist in directing air radially outwardly from the fan. I also employ baffles 22 mounted upon the bottom 11 and extending upwardly into alignment with the centrifugal line of delivery of air from the fan. I also employ the baffles 30 to direct the air upwardly about the pot 1.

It will be realized that, whereas I have described and illustrated a practical and operative device, nevertheless many changes may be made in the size, shape, number and disposition of parts without departing from the spirit of my invention. I therefore wish that my drawings and description be taken as in a broad sense illustrative or diagrammatic, rather than as a limitation to the precise showing.

I claim:

1. In combination, in a pot type burner unit, a burner pot having a side wall provided with a plurality of air inlet apertures located at various levels therein, means for delivering a liquid fuel to the bottom of the pot, a housing surrounding the pot and defining with it a space in communication with said apertures, and vertically extending baffle means in the space between the pot and the housing adapted to constrain the air rising about the pot to a generally vertical direction of flow, the lower ends of said baffle means extending to a level below the bottom of the pot, the upper ends extending upwardly about a lower portion of the pot.

2. In combination, in a pot type burner unit, a burner pot having a closed bottom and a circumferential side wall, said side wall being provided with a plurality of air inlet apertures located at various levels therein, means for delivering a liquid fuel to the bottom of the pot, a housing surrounding the pot and defining with it a space in communication with said apertures, and baffle means in the space between the pot and the housing adapted to constrain the air rising about the pot to a predetermined direction of flow, said housing including a lower partition extending beneath the pot and provided with an air inlet aperture, and a fan aligned with said aperture and located in the space between said partition and the bottom of the pot.

3. In combination, in a pot type burner unit, a burner pot having a closed bottom and a circumferential side wall, said side wall being provided with a plurality of air inlet apertures located at various levels therein, means for delivering a liquid fuel to the bottom of the pot, a housing surrounding the pot and defining with it a space in communication with said apertures, baffle means in the space between the pot and the housing adapted to constrain the air rising about the pot to a predetermined direction of flow, said housing including a lower partition extending beneath the pot and provided with an air inlet aperture, a fan aligned with said aperture and located in the space between said partition and the bottom of the pot, and air directing baffles located exteriorly of said fan in the space between said pot bottom and partition, the baffles extending upwardly about the pot.

4. In combination, in a pot type burner unit, a burner pot having a bottom closed from side to side, a circumferential pot wall extending upwardly therefrom, said wall having a plurality of air inlet apertures located at various levels, means for delivering a liquid fuel to the interior of the pot, a housing surrounding the pot and defining with it a space in communication with said apertures, vertically extending baffle means in the space between the pot and the housing, adapted to constrain the air arising about the pot to a generally vertical direction of flow, the lower ends of the baffles extending to a level below the bottom of the pot, the upper ends extending upwardly about a lower portion of the pot, the housing having a bottom wall spaced below, and apertured in line with the bottom of the pot, a fan located in said aperture and means for rotating the fan, said fan having vanes extending above the level of said bottom wall, the diameter of the aperture in said bottom wall and of the fan being less than the diameter of the pot bottom.

5. In combination, in a pot type burner unit, a burner pot having a bottom closed from side to side, a circumferential pot wall extending upwardly therefrom, said wall having a plurality of air inlet apertures located at various levels, means for delivering a liquid fuel to the interior of the pot, a housing surrounding the pot and defining with it a space in communication with said apertures, vertically extending baffle means in the space between the pot and the housing, adapted to constrain the air arising about the pot to a generally vertical direction of flow, the lower ends of the baffles extending to a level below the bottom of the pot, the upper ends extending upwardly about a lower portion of the pot, the housing having a bottom wall spaced below, and apertured in line with the bottom of the pot, a fan located in said aperture, means for rotating the fan, said fan having vanes extending above the level of said bottom wall, the diameter of the aperture in said bottom wall and of the fan being less than the diameter of the pot bottom, and a deflector plate interposed between the bottom of the pot and the fan, said deflector plate being located at a level above the bottoms of said baffles.

6. In combination, in a pot type burner unit, an outer housing having a circumferential wall and a bottom member, said bottom member having an air inlet aperture located substantially inwardly from its periphery, a burner pot positioned within said outer housing and having a closed end and a circumferential side wall, said pot wall being provided with a plurality of air inlet apertures at various distances from the closed pot end, a fan, aligned with said air inlet aperture in the bottom member of the outer housing, and located within said outer housing and in the space between the bottom of the outer housing and the bottom of the pot and means for preventing swirling of the air as it passes into and along the space directly between the side wall of the pot and the opposed portion of the wall of the outer housing.

7. In combination, in a pot type burner unit, an outer housing having a circumferential wall and a bottom member, said bottom member having an air inlet aperture located substantially inwardly from its periphery, a burner pot positioned within said outer housing and having a closed end and a circumferential side wall, said pot wall being provided with a plurality of air inlet apertures at various distances from the closed pot end, a fan, aligned with said air inlet aperture in the bottom member of the outer housing, and located within said outer housing and in the space between the bottom of the outer housing and the bottom of the pot and means for preventing swirling of the air as it passes into and along the space directly between the side wall of the pot and the opposed portion of the wall of the outer housing, said means including baffles generally parallel with the axis of the pot.

JAMES L. BREESE.